US008913830B2

(12) United States Patent
Sun et al.

(10) Patent No.: US 8,913,830 B2
(45) Date of Patent: Dec. 16, 2014

(54) MULTILEVEL IMAGE SEGMENTATION

(75) Inventors: Yiyong Sun, Lawrenceville, NJ (US);
Herve Lombaert, Montreal (CA); Leo Grady, Yardley, PA (US); Chenyang Xu, Allentown, NJ (US)

(73) Assignee: Siemens Aktiengesellschaft, Munich (DE)

(*) Notice: Subject to any disclaimer, the term of this patent is extended or adjusted under 35 U.S.C. 154(b) by 2180 days.

(21) Appl. No.: 11/313,102

(22) Filed: Dec. 20, 2005

(65) Prior Publication Data

US 2006/0159342 A1    Jul. 20, 2006

Related U.S. Application Data

(60) Provisional application No. 60/644,825, filed on Jan. 18, 2005.

(51) Int. Cl.
*G06K 9/00*         (2006.01)
*G06K 9/34*         (2006.01)
*G06T 7/00*         (2006.01)

(52) U.S. Cl.
CPC ..... *G06T 7/0081* (2013.01); *G06T 2207/20016* (2013.01); *G06T 7/0097* (2013.01); *G06T 2207/20036* (2013.01); *G06T 2207/20101* (2013.01); *G06T 7/0093* (2013.01); *G06T 2207/30048* (2013.01); *G06K 9/342* (2013.01)
USPC ........................................... 382/173; 382/164

(58) Field of Classification Search
USPC .................. 382/164, 173, 282; 358/453, 538
See application file for complete search history.

(56) References Cited

U.S. PATENT DOCUMENTS

| 5,841,890 | A  | * | 11/1998 | Kraske ......................... 382/131 |
| 2002/0048401 | A1 | * | 4/2002 | Boykov et al. ................ 382/173 |
| 2003/0072487 | A1 | * | 4/2003 | Fan et al. ...................... 382/176 |
| 2004/0109584 | A1 | * | 6/2004 | Lestideau ..................... 382/103 |
| 2005/0207628 | A1 | * | 9/2005 | Kim .............................. 382/128 |
| 2005/0228250 | A1 | * | 10/2005 | Bitter et al. .................. 600/407 |
| 2006/0029275 | A1 | * | 2/2006 | Li et al. ........................ 382/173 |
| 2007/0036432 | A1 | * | 2/2007 | Xu et al. ...................... 382/173 |

OTHER PUBLICATIONS

J.A. Hird ("Multiresolution object detection and segmentation using top-down algorithms", IEEE 3rd Int'l Conf. on Image Processing and Its Applications, Jul. 18-20, 1989, pp. 416-420).*
D. Adalsteinsson, et al., A Fast Level Set Method for Propagating Interfaces, Journal of Computational Physics, 118:269-277, 1995.
A. Barbu, et al., Multigrid and Multi-level Swendsen-Wang Cuts for Hierarchic Graph Partition, IEEE Int'l Conf. on Comp. Vision & Pattern Recog.vol. 2, pp. 731-738, 2004.

(Continued)

*Primary Examiner* — Yubin Hung

(57) ABSTRACT

A multilevel image segmentation technique using graph cuts is disclosed. A reduced resolution image is generated from a full resolution image which is to be segmented. The reduced resolution image is then segmented in order to identify a boundary between an object and a background within the image. The identified boundary then identifies a portion of an increased resolution image which is segmented in order to refine the earlier identified boundary. The steps may be iterated for successively increasing image resolutions in order to refine the boundary as required by a particular application. An initial identification of object and background portions of the image may be provided as input by a user. Alternatively, a user may identify only the object portion, and the background portion may be automatically determined.

25 Claims, 3 Drawing Sheets

(56) References Cited

OTHER PUBLICATIONS

Y. Boykov, et al., Interactive Graph Cuts for Optimal Boundary & Region Segmentation of Objects in N-D Images, Int'l Conf. on Computer Vision, vol. 1, pp. 105-112, Jul. 2001.

Y. Boykov, et al., An Exper. Compar. of Mini-Cut/Max-Flow Algorithms for Energy Min. in Vision, IEEE Trans. on Pattern Anal. & Mach. Intell., 26(9)1124-1137, Sep. 2004.

B. Gidas, A Renormalization Group Approach to Image Processing Problems, IEEE Transactions on Pattern Analysis & Machine Intelligence, 11(2); 164-180, Feb. 1989.

G. Karypis, et al., Multilevel K-Way Partitioning Scheme for Irregular Graphs, Journal of Parallel and Distributed Computing, 48:96-129, 1998.

T.Y. Kong, et al., Digital Topology: Introduction and Survey, Computer Vision, Graphics, and Image Processing: Image Understanding, 48:357-393, 1989.

S. Krishnamachari, et al., Multiresolution Gauss Markov Random Field Models, IEEE Transactions on Image Processing, 6:251-267, Feb. 1997.

Y. Li. et al., Lazy Snapping, Proceedings of ACM SIGGRAPH 2004, vol. 23, pp. 303-308, ACM Press, Apr. 2004.

P. Perez, et al., Restriction of a Markov Random Field on a Graph & Multiresolution Statistical Image Modeling, IEEE Transactions on Infor. Theory, 42(1): 180-190, Jan. 1996.

C. Rother, et al., Grabcut—Interactive Foreground Extraction Using Iterated Graph Cuts, Proceedings of ACM SIGGRAPH 2004, vol. 23, pp. 309-314, ACM Press, Apr. 2004.

N. Xu, et al., Object Segmentation Using Graph Cuts Based Active Contours, IEEE Int'l Conf. on Computer Vision & Pattern Recognition, vol. 2, pp. 46-53, 2003.

\* cited by examiner

US 8,913,830 B2

MULTILEVEL IMAGE SEGMENTATION

This application claims the benefit of U.S. Provisional Application No. 60/644,825 filed Jan. 28, 2005, which is incorporated herein by reference.

BACKGROUND OF THE INVENTION

The present invention relates generally to image processing, and more particularly to multilevel image segmentation.

Digital image processing is becoming increasingly popular as digital imaging devices continue to become more powerful. For example, digital cameras can generate pictures having 10 million pixels, and Computed Tomography (CT) scanners may produce volume data having more than 100 million voxels. Processing these images places a large computational burden on the various devices that perform image processing.

One type of processing that is often performed on image data is segmentation, whereby a boundary is determined between different portions of the image. For example, in digital photography, it is often desirable to define a boundary between a main object and background, in order to segment out the main object. After the main object is segmented, the main object and background may be processed separately. Similarly, in the medical imaging field, it is often desirable to segment out a particular object, or portion of an object, from a CT scan image. For example, in the case of a CT scan of a human heart, it may be desirable to segment out a portion of the heart (e.g., left atrium) in order to allow a physician to more easily analyze the image. One example of segmentation is illustrated in FIG. 1 which shows a rough image 100 of the left side of a human heart. Assume that the object of interest is the left atrium 102 with the remaining portion of the image not being of interest. A desirable segmentation is one which provides a boundary between the object of interest 102 and the remaining portion of the image. Such a boundary is shown in FIG. 1 as dotted line 104. Thus, an appropriate segmentation process would generate boundary 104 between the object of interest 102 and the remainder of the image.

One well know technique for image segmentation is the use of graph cuts, as described in Y. Boykov and M. Jolly, Interactive Graph Cuts for Optimal Boundary & Region Segmentation of Objects in N-D Images, Proceedings of International Conference on Computer Vision, Vol. 1, July 2001, Vancouver, Canada, pp 105-112. As will be described in further detail below, the graph cuts technique is an interactive segmentation technique that divides an image into two segments, an object and background. A user imposes constraints for the segmentation by indicating certain pixels that are part of the object and certain pixels that are part of the background. The image is then automatically segmented using graph cuts to find the globally optimal segmentation of the image.

The above identified graph cuts technique has become one of the leading algorithms for interactive image segmentation in 2 dimensions (2D) and 3 dimensions (3D). While this technique provides accurate results for low resolution images, it is of limited use for high resolution images due to its intense memory requirements and its supralinear time complexity. For example, to segment a typical CT volume of $512^3$ voxels in a medical imaging application, the memory consumption would be more than 8GB, which is impractical for current clinical computers. Further, in a worst case complexity scenario, such segmentation could require an extremely long processing time in order to complete, which is impractical for a medical imaging application.

Thus, what is needed is a computationally efficient segmentation technique that provides acceptable segmentation results.

BRIEF SUMMARY OF THE INVENTION

The present invention provides an improved multilevel image segmentation technique.

In accordance with an embodiment of the invention, a reduced resolution image is generated from a full resolution image which is to be segmented. The reduced resolution image is then segmented in order to identify a boundary between an object and a background within the image. The identified boundary then identifies a portion of an increased resolution image which is segmented in order to refine the earlier identified boundary. By only segmenting a low resolution image of the entire image, and then segmenting only portions of the increased resolution image, significant computational resources (e.g., computer cycles and memory utilization) are saved. The steps may be iterated for successively increasing image resolutions in order to refine the boundary as required by a particular application. In an advantageous embodiment, the portion of the increased resolution image to be segmented may be identified by performing a dilation operation on the prior identified boundary, and identifying the outer portion of the dilation results as the background, and identifying the inner portion of the dilation results as the object.

An initial identification of object and background portions of the image may be provided as input by a user. In an alternative embodiment, a user may identify only the object portion, and the background portion may be automatically determined. This automatic determination of the background portion may be performed by using an identified object portion as a seed for performing a region growing operation, performing a dilation operation on the result of the region growing operation, and identifying at least one point resulting from the dilation as a background point.

In an advantageous embodiment, the segmentation steps are performed using a graph cut technique.

These and other advantages of the invention will be apparent to those of ordinary skill in the art by reference to the following detailed description and the accompanying drawings.

DETAILED DESCRIPTION

Figure 2:
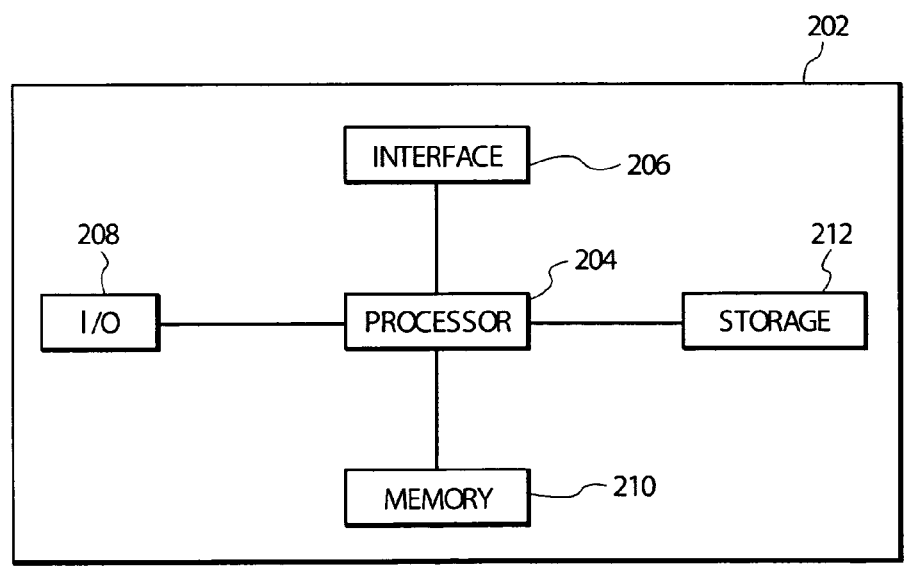
FIG. 2 is a high level block diagram of a computer which may be used to implement the present invention.

The following description describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer is shown in FIG. 2. Computer 202 contains a processor 204 which controls the overall operation of computer 202 by executing computer program instructions which define such operation. The computer program instructions may be stored in a storage device 212 (e.g., magnetic disk, optical disk, or any other computer readable medium) and loaded into memory 210 when execution of the computer program instructions is desired. Memory 210 may also be used to store data used during the various steps of the method. Computer 202 also includes one or more interfaces 206 for communicating with other devices (e.g., locally or via a network). Computer 202 also includes input/output 208 which represents devices which allow for user interaction with the computer 202 (e.g., display, keyboard, mouse, speakers, buttons, etc.). One skilled in the art will recognize that an implementation of an actual computer will contain other components as well, and that FIG. 2 is a high level representation of some of the components of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Further, in various implementations, the functions described herein may be performed on a dedicated apparatus, or the functions may be part of a device that performs other functions as well.

The present invention provides a multilevel banded graph cut method for fast image segmentation. In general, the technique according to the present invention performs segmentation at various resolution levels in order to identify boundaries between an object and background, and propagates the segmentation solution from lower levels to higher levels. Advantageously, segmentations after the first level segmentation are only performed on a portion of the image. More particularly, segmentations after the first level are performed on the portion of the image identified by the boundary of the prior level segmentation. By performing the higher resolution segmentations in only that position of the image that needs to be refined (e.g., the boundary between the object and the background) significantly less computing resources are used as compared to the prior art approaches. This multilevel banded approach makes it possible to achieve high quality segmentation results on large data sets with faster speed and less memory consumption, thus allowing it to be used in a wider range of applications where high performance segmentation of large image data sets is required.

Figure 3:
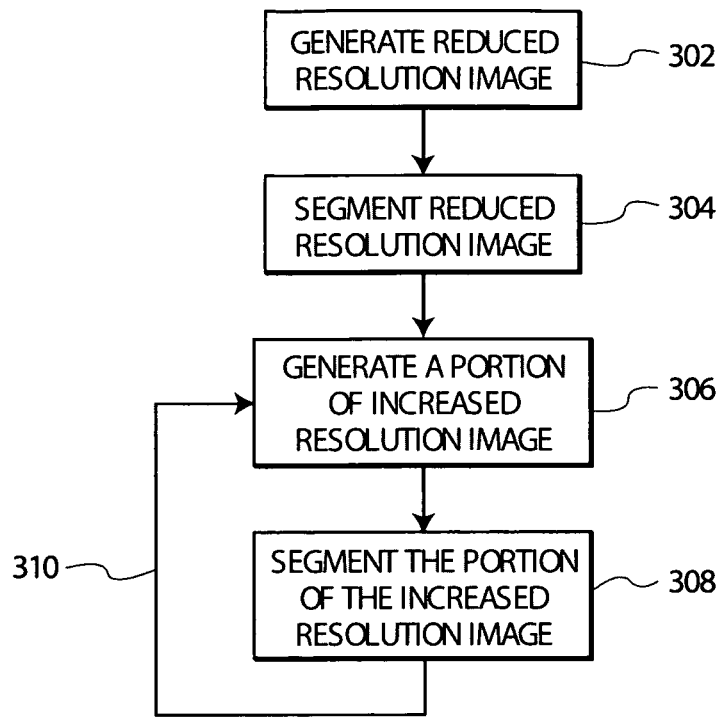
FIG. 3 is a flowchart showing the steps performed in accordance with an embodiment of the invention.

The flowchart of FIG. 3 illustrates the steps performed in accordance with an embodiment of the invention. Starting with a full resolution image, the first step 302 is to generate a reduced resolution image. The reduced resolution image is then segmented in step 304 to identify a boundary between an object and the background of the image. Next, in step 306, a portion of an increased resolution image is generated. The portion that is generated is based upon the boundary identified in step 304. Thus, in step 306, the entire higher resolution image is not needed. Only a portion of the higher resolution image, as identified by the previously identified boundary, is needed. Then, in step 308, the generated portion of the increased resolution image is segmented in order to generate a refined boundary in the increased resolution image. As represented by arrow 310, steps 306 and 308 may be iterated, each time performing segmentation on a higher resolution image, until a boundary having a desired resolution is generated. Thus, by performing multilevel segmentation as shown in FIG. 3, segmentation is performed in stages, whereby the higher resolution segmentations are only performed on a portion of the image, thus reducing memory and computational requirements.

Figure 4:
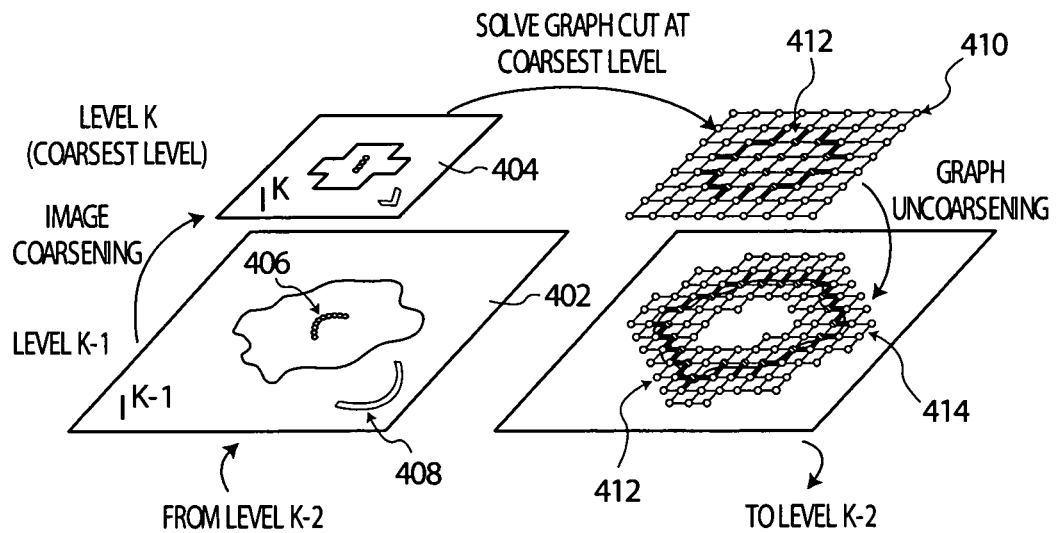
FIG. 4 graphically illustrates multilevel segmentation in accordance with an embodiment of the invention.

Further details of an embodiment of the invention will now be described in conjunction with FIG. 4, which graphically illustrates multilevel segmentation in accordance with an embodiment of the invention. In one embodiment of the invention, the segmentation performed may be segmentation in accordance with the graph cuts algorithm described in Y. Boykov and M. Jolly, Interactive Graph Cuts for Optimal Boundary & Region Segmentation of Objects in N-D Images, Proceedings of International Conference on Computer Vision, Vol. 1, July 2001, Vancouver, Canada, pp 105-112, which is hereby incorporated herein by reference. That algorithm will be described briefly herein as follows. An N-dimensional (N-D) image can be specified by a pair (P,I) consisting of a finite discrete set P of N-D points (pixels in 2D and voxels in 3D), and a mapping I that maps each point p in P to a value I(p) in some arbitrary value space. From a given image, a weighted undirected graph G=(V,E,W) can be constructed that consists of nodes (vertices) v∈V, edges e∈E, and nonnegative weights (costs) w∈W. There are two special nodes in V: a source S node specifying the "object" terminal and a sink T node specifying the "background" terminal. The remaining nodes in V form a subset U=V/{S,T} where each node u∈U uniquely identifies an image point in P. The set of edges E consist of two types of undirected edges: n-links (neighborhood links) and t-links (terminal links). Each image node U∈U has two t-links {u, S} and {u, T} directly connected to the terminal S and T, respectively. However, n-links are completely determined by the neighborhood system used (e.g., 4- or 8-neighborhood system in 2-D and 6-, 18-, or 26-neighborhood system in 3D). It is noted that larger neighborhood systems typically yield better image segmentation results, but at the expense of both increased computation time and memory consumption.

The segmentation of an image into object and background, known also as hard segmentation, can be expressed as a binary vector $A=(A_1, \ldots, A_u, \ldots, A_{|U|})$, where the element $A_u$ gives the binary segmentation label of an image point identified by the node u. A segmentation A can be uniquely determined by a cut C on the graph G, where the cut C is defined as a subset of edges in E such that the terminals become separated on the induced graph G(C)=(V, E/C). Hence the image segmentation problem can be solved as a minimum graph cut problem on the following energy function $$\hat{C} = \underset{C \in F}{\operatorname{argmin}} \sum_{e_{ij} \in C} w_{ij} \quad (1)$$

where $e_{ij}$ denotes the edge e spanning between the nodes $v_i$, $v_j \in V$, $w_{ij}$ denotes the weight assigned to the edge $e_{ij}$, and F denotes the set of all feasible cuts.

Assume that O and B denote the subsets of image nodes marked as object and background seeds by the user, respectively. Then the weight $w_{ij}$ for the graph is given by $$w_{ij} = \begin{cases} \exp\left(-\frac{(I_i - I_j)^2}{2\sigma^2}\right) \bigg/ dist(u_i, u_j) & u_i, u_j \in U, \\ MAX & u_i \in O, u_j = S, \\ MAX & u_i \in B, u_j = T, \\ 0 & \text{otherwise} \end{cases} \quad (2)$$

where dist $(u_i, u_j)$ is the Euclidean distance between image points $p_i$ and $p_j$ identified by nodes $u_i$ and $u_j$, respectively, $I_i = I(p_i), I_j = I(p_j)$, and MAX is a very large positive constant. This energy penalizes cuts that pass through homogeneous regions and encourages cuts that pass through places where intensity discontinuity is large. The constant parameter $\sigma$ can be chosen empirically or estimated as a standard deviation over an image sample.

Figure 1:
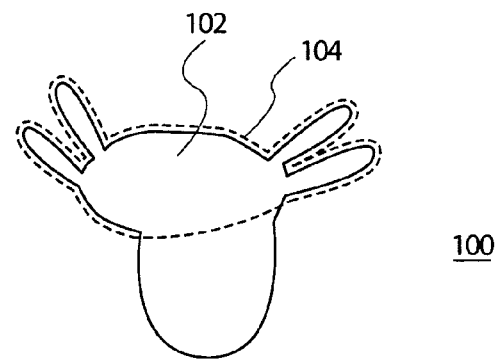
FIG. 1 shows an example of image segmentation.

Further details of the multilevel graph cut technique in accordance with an embodiment of the present invention will now be described in conjunction with FIG. 4. As described above in conjunction with FIG. 1, a method in accordance with the principles of the invention includes three stages: coarsening (i.e., reducing image resolution), initial segmentation, and uncoarsening (i.e., increasing image resolution).

During the coarsening stage, a sequence of smaller images $(I^0, I^1, \ldots, I^K)$, are constructed from the original image $I^0$ such that the size constraint $M_n^k \leq M_n^{k-1}$ is satisfied for each dimension $n=1, \ldots, N$, and each level $k=1, \ldots, K$, respectively, where M represents one of the dimensions of the image or volume. Note that this constraint does not require the size in each dimension to be reduced simultaneously. This image coarsening is represented in FIG. 4 which shows image $I^{K-1}$ 402 being coarsened to image $I^K$ 404. (The image 402 may be the result of coarsening of a prior image (not shown) from level K-2.) Thus, image 404 is a reduced resolution image as compared to image 402. In additional to image coarsening, the location of the object seeds 406 and background seeds 408, identified by O and B respectively, are also coarsened. The object and background seeds are provided as user input, for example by a user identifying the seed points by mouse clicks, or mouse drags. The seed coarsening operator must satisfy the causality constraint so that the discrete topology of both the object and background seed regions is preserved throughout all levels, i.e., the number of connected object and background seed regions must be preserved. Therefore, different coarsening operators should be chosen for coarsening the image and the seeds. In an advantageous embodiment, the image is coarsened using either a weighted mean filter followed by a down sampling of 2 operation, or a down sampling of 2 operation. An ad-hoc seed location coarsening operator is chosen such that the causality constraint is satisfied.

The second stage is the initial segmentation of the coarsest image $I^K$ 404. First, a coarse graph $G^K=(V^K, E^K, W^K)$ 410 is constructed for $I^K$ 404 as described above. Next, the minimum cut $C^K$ 412 of the coarse graph $G^K$ 410 is determined, also as described above. This minimum cut 412 yields a segmentation on the image $I^K$.

During the uncoarsening stage, a binary boundary image $J^k$ is generated to represent all the image points that are identified by the nodes in the cut $C^k$, $k \in \{1, \ldots, K\}$, and to project these identified image points onto a higher resolution boundary image $J^{k-1}$ at level k-1 using an image uncoarsening operator. It is noted that the uncoarsening operator not be the dual operator of the image coarsening operator used in the first stage due to the binary nature of the boundary image. In an advantageous embodiment, the uncoarsening operator is defined as follows:

$$J^{K-1}(p) = J^K(\alpha(p)), \quad (3)$$

where $p=(p_1, p_2, \ldots, p_N)$ is an N-D point and $\alpha(p)=(\alpha_1(p_1), \alpha_2(p_2), \ldots, \alpha_N(p_N))$ is the reduction mapping used in the coarsening phase to reduce the dimension size under the size constraint.

The resulting boundary image $J^{k-1}$ contains a narrow band that bounds the candidate boundaries of objects to be extracted from $I^{k-1}$. The width of the band may be controlled by an optional dilation of the band by a distanced $d \geq 0$. The dilation distance parameter plays an important role. If d is small, the algorithm may not be able to recover the full details of objects with high shape complexity or high curvature. On the other hand, if d is large, the computational benefits of banded graph cuts will be reduced and the wider band may also introduce potential outliners far away from the desired object boundaries. In an advantageous embodiment, choosing d=1 is a good compromise between accuracy and performance for most of real-world 2D and 3D images.

The graph $G^{k-1}$ 412 is then constructed using only the nodes inside the band from the boundary image $J^{k-1}$. The band's outer layer is used as the new background seeds B and the band's inner layer are used as the new object seeds O. In the degenerated case, where the band contains no inner layer due to either segmenting small objects or using large band width, the coarsened object seeds at level k-1 are used as the object seeds O. The coarsened object seeds are guaranteed to lie inside objects to be segmented. Next, weights are assigned to all edges according to equation (2).

Once the graph $G^{k-1}$ 412 is constructed, the minimum cut $C^{k-1}$ 414 on $G_{k-1}$ 412 is solved. The same uncoarsening procedure may be repeated recursively at the next level until the minimum cut $C^0$ is solved on the banded graph $G^0$, yielding the final segmentation result. It is noted that all graphs at levels $k=0, \ldots, K-1$ have a banded graph structure except the graph $G^K$, which is significantly smaller than the full grid graph constructed for the image at the same level.

Figure 5:
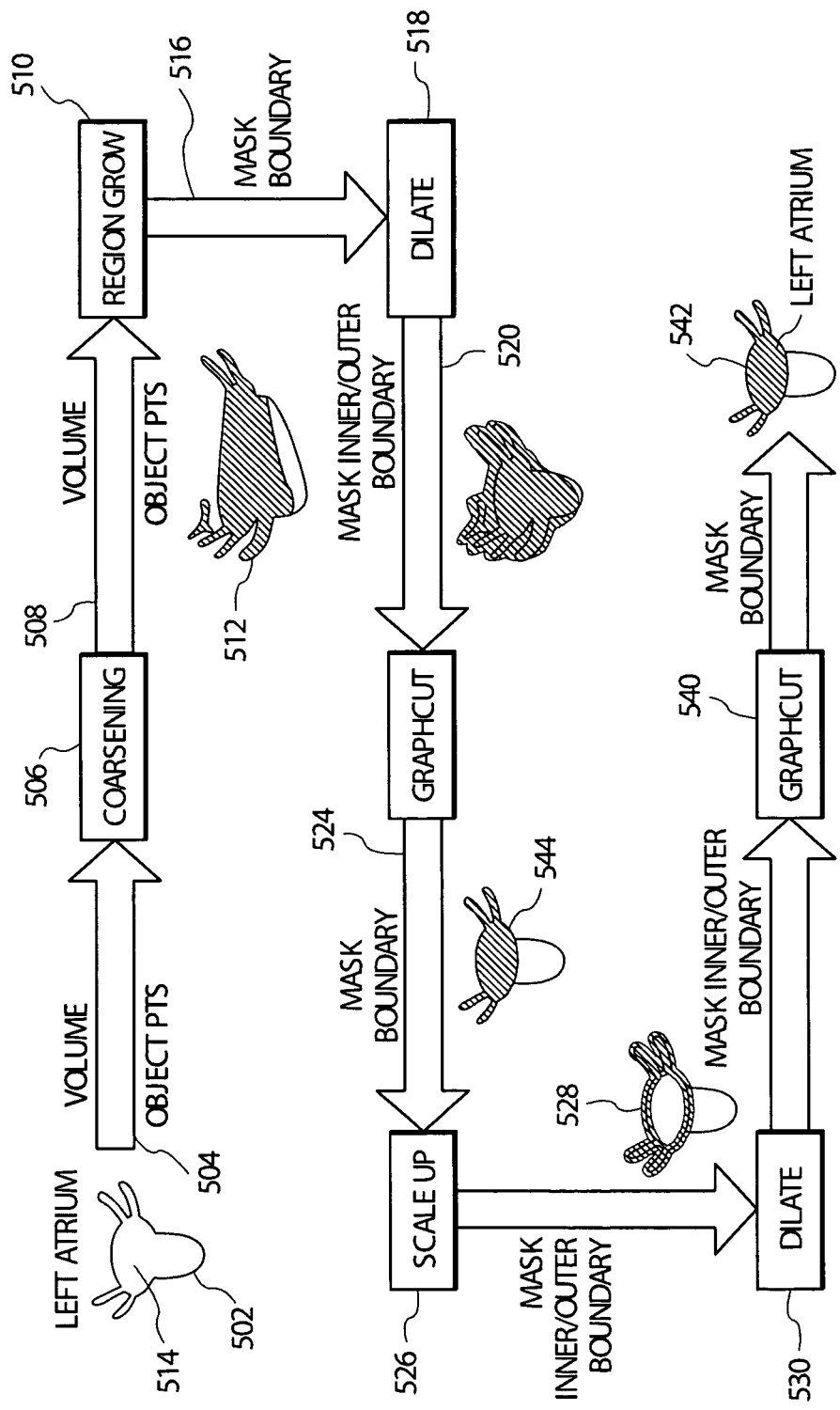
FIG. 5 illustrates a particular embodiment of the invention which applies the inventive segmentation technique to the problem of segmentation of the left atrium in an image volume representing a heart.

One particular embodiment of the invention will now be described in conjunction with FIG. 5, which applies the above described segmentation technique to the problem of segmentation of the left atrium in an image volume representing a heart. FIG. 5 represents the processing steps, inputs and outputs according to this embodiment. It should be understood that FIG. 5, along with its description, is a high level description of one embodiment of the invention. The description will proceed at a high level, with an understanding that the details of the various steps are as described above. Thus, FIG. 5 is meant to provide an overview description showing how the technique described in detail above may be applied in a medical imaging implementation. FIG. 5 shows an image 502 of a heart which may be generated, for example, by a CT scan. The CT scan image volume, along with an identified object point, as represented by arrow 504, are provided to a coarsening step 506. It is noted that this embodiment allows a user to identify a single point as the object, and does not require the user to identify any background points. The single object point identified by the user is represented as 514. The determination of background points will be described below.

In step 506, the image is coarsened (i.e., its resolution is reduced) as described above. Although a user only needs to identify a single object point, the segmentation method requires at least one identified background point. In this embodiment, therefore, there is a need to identify points slightly outside of the left atrium. The present invention determines these background points automatically using a combination of region growing and dilation as described below.

The reduced image volume, along with the object point(s), as represented by arrow 508, are passed to the region growing step 510. In this step, a region growing operation is applied from the object point identified by the user. In an advantageous embodiment, this region growing is a seeded region grow in which new voxels are added according to priority. Seeded region growing is described in R. Adams and L. Bischof, Seeded Region Growing, IEEE Trans. Pattern Anal. Mach. Intell., 16(6):641-647, June 1994, which is incorporated herein by reference. In one embodiment, a radius of 8 cm may be used during the region growing step. The resulting image is represented as 512. The boundary of the region growing selection (as defined by a mask), as represented by arrow 516, is passed to a dilation step 518, where the boundary is dilated by a fixed length (e.g., 1 or 2 voxels). The dilation ensures that the boundary of the region growing selection is outside the left atrium. Points on the boundary are then identified as the background points. The goal is to mark as background as many neighboring features as possible (such as the right atrium, the ventricles, and the aorta), which improves the results of the graph cuts.

The boundary is passed to the next step, as represented by arrow 520 (where inn/outer boundary represents the dilation results). The graphcut (step 522) segments out the left atrium in low resolution, using the segmentation techniques described above. The object point selected by the user along with its neighbors are marked as the object. The dilated boundary from step 518 provides the background points. Since this segmentation operation is performed on a low resolution image, the segmentation does not require a large amount of computational resources or memory. The results from the graphcut step 520 provides a rough estimate of the segmentation, which is represented by arrow 524. This rough segmentation is illustrated as 544.

In step 526, the rough segmentation 544 is scaled up to the original image resolution. In step 530 the scaled up rough segmentation received from step 526 is dilated to generate a banded region (shown in FIG. 5 as 528) around the left atrium. The inner boundary of the band is inside the left atrium, and the outer boundary of the band outside the left atrium. The inner boundary points are used as the object points for the next segmentation step, and the outer boundary points are used as the background points for the next segmentation step.

In step 540, the points in the banded region 528 are segmented in graphcut step 540. Since the domain of the graph is small and narrow, the graphcut step 540 can be performed quickly and without a large memory requirement. The resulting segmentation is shown as 542.

It is noted that in an alternate embodiment, the order of steps 526 and 530 could be switched, so that the rough segmentation 544 is first dilated in low resolution to form a band, and then scaled up to the higher resolution.

Addition control of the segmentation is possible if the user marks additional points as the object or the background. By providing these additional points to the region growing step 510 and the low resolution graphcut step 522, the user's input can be integrated into the segmentation process. In another alternate embodiment, in the case of images with homogeneous intensities in the chambers, the final banded graphcut step 540 can be replaced with an efficient thresholding approach which could generate similar segmentation accuracy.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. For example, the techniques of the present invention could be extended to segment 4 (or more) dimensional images as well.

The invention claimed is:

1. A method for processing a full resolution CT scan image comprising:
 a) generating at a computer a reduced resolution image from said full resolution CT scan image;
 b) segmenting at said computer said reduced resolution image to identify a boundary between an object and a background;
 c) generating at said computer an increased resolution boundary image, said increased resolution boundary image corresponding to only a portion of an area of said full resolution CT scan image, based on said prior identified boundary; and
 d) segmenting at said computer said increased resolution boundary image to generate a refined boundary by:
  generating a graph of said increased resolution boundary image, wherein said step of generating a graph for said increased resolution boundary image uses an outer layer of said increased resolution boundary image as object seeds and the inner layer of said increased resolution boundary image as background seeds, and
  performing a graph cut on said graph.

2. The method of claim 1 wherein said increased resolution boundary image has the same resolution as said full CT scan resolution image.

3. The method of claim 1 further comprising the steps of:
 receiving an identification of at least a portion of said object as user input; and
 automatically determining at least a portion of said background.

4. The method of claim 3 wherein said step of automatically determining at least a portion of said background further comprises:
 performing a region growing operation using said at least a portion of said object as a seed;
 performing a dilation operation on a result of said region growing operation; and
 identifying at least one point resulting from said dilation operation as background.

5. The method of claim 1 further comprising:
 iteratively repeating steps c and d using images having successively increasing resolutions.

6. The method of claim 1 wherein said step b comprises:
 generating a graph of said reduced resolution image; and
 performing a graph cut on said graph.

7. The method of claim 1 further comprising the step of identifying said portion by projecting said prior identified boundary onto said increased resolution image.

8. The method of claim 7 wherein said step of identifying said portion further comprises:
 performing a dilation operation on said projected prior identified boundary.

9. The method of claim 8 further comprising the steps of:
 identifying an outer portion of said dilated projected prior identified boundary as background; and identifying an inner portion of said dilated projected prior identified boundary as object.

10. The method of claim 1 wherein said increased resolution boundary image represents a boundary region of said full resolution CT scan image.

11. An apparatus for processing a full resolution image comprising:
a processor; and
a non-transitory computer readable medium storing computer program instructions, which when executed by the processor cause the processor to perform operations comprising:
a) generating a reduced resolution image from said full resolution image;
b) segmenting said reduced resolution image to identify a boundary between an object and a background;
c) generating an increased resolution boundary image, said increased resolution boundary image corresponding to only a portion of an area of said full resolution image, based on said prior identified boundary; and
d) segmenting said increased resolution boundary image to generate a refined boundary by:
generating a graph of said increased resolution boundary image, wherein said generating a graph for said increased resolution boundary image uses an outer layer of said increased resolution boundary image as object seeds and the inner layer of said increased resolution boundary image as background seeds, and performing a graph cut on said graph.

12. The apparatus of claim 11 wherein said increased resolution image has the same resolution as said full resolution image.

13. The apparatus of claim 11 wherein the operations further comprise:
receiving an identification of at least a portion of said object as user input; and
automatically determining at least a portion of said background.

14. The apparatus of claim 13 wherein said automatically determining at least a portion of said background further comprises:
performing a region growing operation using said at least a portion of said object as a seed;
performing a dilation operation on a result of said region growing operation; and
identifying at least one point resulting from said dilation operation as background.

15. The apparatus of claim 11 wherein the operations further comprise:
iteratively repeating operations c and d using images having successively increasing resolutions.

16. The apparatus of claim 11 wherein said operation b comprises:
generating a graph of said reduced resolution image; and
performing a graph cut on said graph.

17. The apparatus of claim 11 wherein the operations further comprise:
identifying said portion by projecting said prior identified boundary onto said increased resolution image.

18. The apparatus of claim 17 wherein said identifying said portion further comprises:
performing a dilation operation on said projected prior identified boundary.

19. The apparatus of claim 18 wherein the operations further comprise:
identifying an outer portion of said dilated projected prior identified boundary as background; and
identifying an inner portion of said dilated projected prior identified boundary as object.

20. The apparatus of claim 11 wherein said increased resolution boundary image represents a boundary region of said full resolution image.

21. A method for segmenting a CT scan image ($I^0$) based on object seeds O and background seeds G comprising the steps of:
a) generating at a computer a plurality (K) of reduced resolution images ($I^1, \ldots, I^K$);
b) generating at said computer a graph $G^K$ for the lowest resolution image $I^K$;
c) calculating at said computer a minimum cut $C^K$ of said graph $G^K$ based on O and G;
d) generating at said computer a binary boundary image $J^k$ to represent the image points identified by nodes in said minimum cut $C^K$;
e) projecting at said computer said image points onto a higher resolution boundary image $J^{k-1}$;
f) generating at said computer a graph $G^{K-1}$ for said higher resolution boundary image $J^{k-1}$; and
g) calculating at said computer a minimum cut $C^{K-1}$ for said graph $G^{K-1}$,
wherein said step of generating a graph $G^{K-1}$ for said higher resolution boundary image $J^{k-1}$ uses the outer layer of said higher resolution boundary image as object seeds (O) and the inner layer of said higher resolution boundary image as background seeds (G).

22. The method of claim 21 further comprising the step of:
recursively repeating steps d-g until a minimum cut $C^0$ is calculated on a graph $G^0$ to generate a segmentation of image $I^0$.

23. The method of claim 21 further comprising the step of:
applying a dilation operation (where distance d≥0) on said higher resolution boundary image $J^{k-1}$.

24. The method of claim 23 wherein d=1.

25. The method of claim 21 wherein said step of projecting said image points onto a higher resolution boundary image $j^{k-1}$ is performed according to:

$$j^{k-1}(p)=j^k(a(p)).$$

* * * * *